(12) United States Patent
Endo et al.

(10) Patent No.: US 6,518,559 B2
(45) Date of Patent: Feb. 11, 2003

(54) SEMICONDUCTOR IMAGE PICKUP DEVICE

(75) Inventors: Yasuyuki Endo, Tokyo (JP); Yutaka Arima, Tokyo (JP); Hiroki Ui, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/731,802

(22) Filed: Dec. 8, 2000

(65) Prior Publication Data

US 2002/0008190 A1 Jan. 24, 2002

(30) Foreign Application Priority Data

Jul. 21, 2000 (JP) .......................................... 2000-221309

(51) Int. Cl.[7] .............................................. H01L 27/00
(52) U.S. Cl. ................................. 250/208.1; 250/214 R
(58) Field of Search .......................... 250/208.1, 214 R; 257/290; 348/308–314

(56) References Cited

U.S. PATENT DOCUMENTS

| | | | | |
|---|---|---|---|---|
| 4,484,223 A | * | 11/1984 | Tsunekawa | 358/213 |
| 4,835,735 A | * | 6/1989 | Kyomasu | 358/213.31 |
| 4,839,735 A | * | 6/1989 | Kyomasu et al. | 358/213.31 |
| 5,083,175 A | * | 1/1992 | Hack et al. | 357/30 |
| 5,539,196 A | * | 7/1996 | Miyawaki et al. | 250/208 |
| 6,215,113 B1 | * | 4/2001 | Chen et al. | 250/208.1 |
| 6,350,981 B1 | * | 2/2002 | Uno | 250/214 R |

FOREIGN PATENT DOCUMENTS

| | | |
|---|---|---|
| EP | 905 788 | 3/1999 |
| EP | 928 101 | 7/1999 |

OTHER PUBLICATIONS

K. Yonemoto et al; "A CMOS Image Sensor with a Simple FPN–Reduction Technology and a Hole Accumulated Diode", *ISSCC Digest of Technical Papers*, (Feb. 7, 2000).

* cited by examiner

*Primary Examiner*—Robert H. Kim
*Assistant Examiner*—Irakli Kiknadze
(74) *Attorney, Agent, or Firm*—Leydig, Voit & Mayer, Ltd.

(57) ABSTRACT

A semiconductor image pickup device includes a pixel array having pixels arranged in a matrix. Each pixel includes a photodiode that converts an optical signal into an electrical signal, and a transistor connected to a charge accumulation section of the photodiode. A buffer is additionally provided. This buffer controls the transistor of the pixels using a lower control power supply voltage than a power supply voltage of the pixel array.

3 Claims, 11 Drawing Sheets

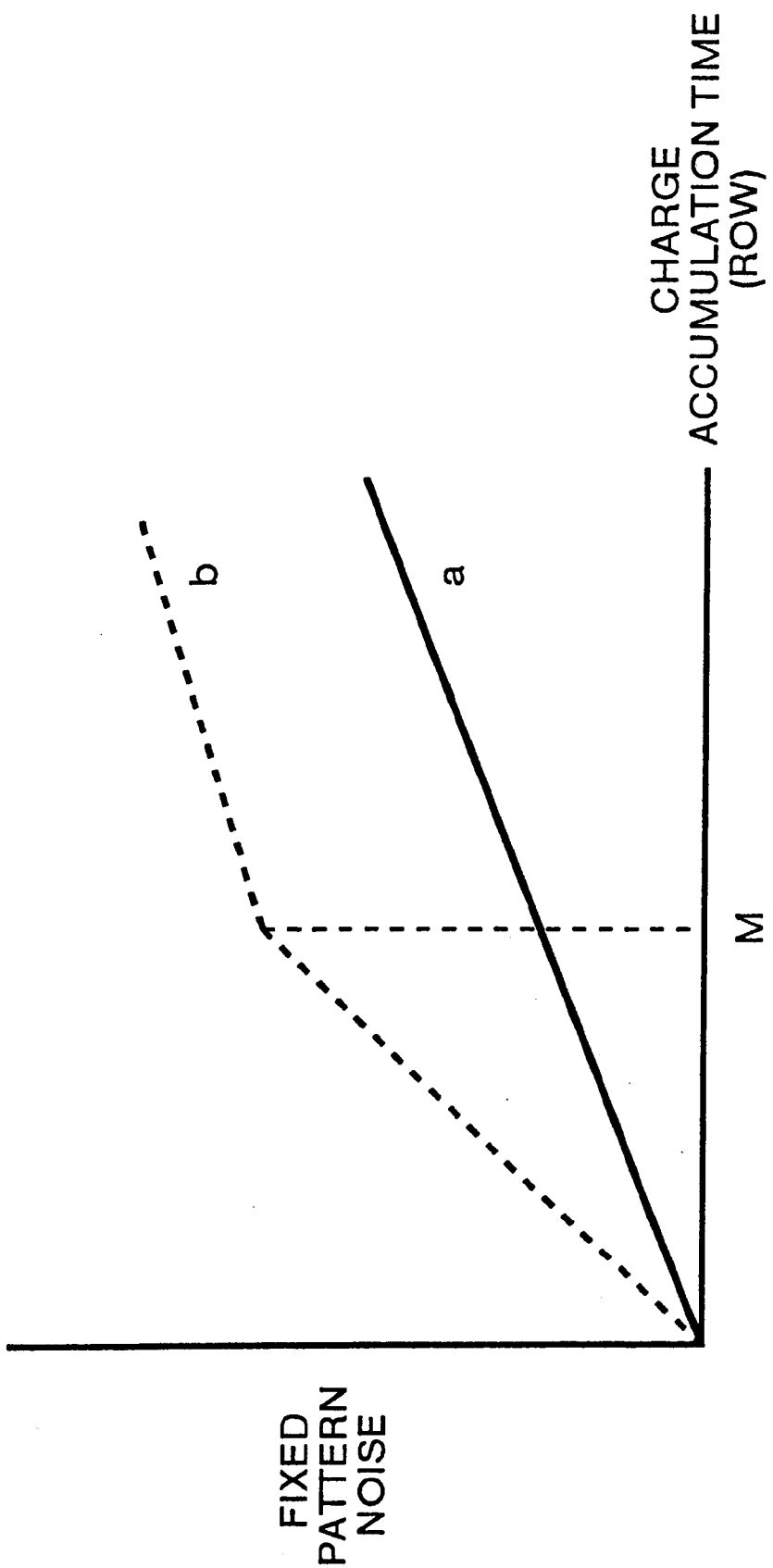

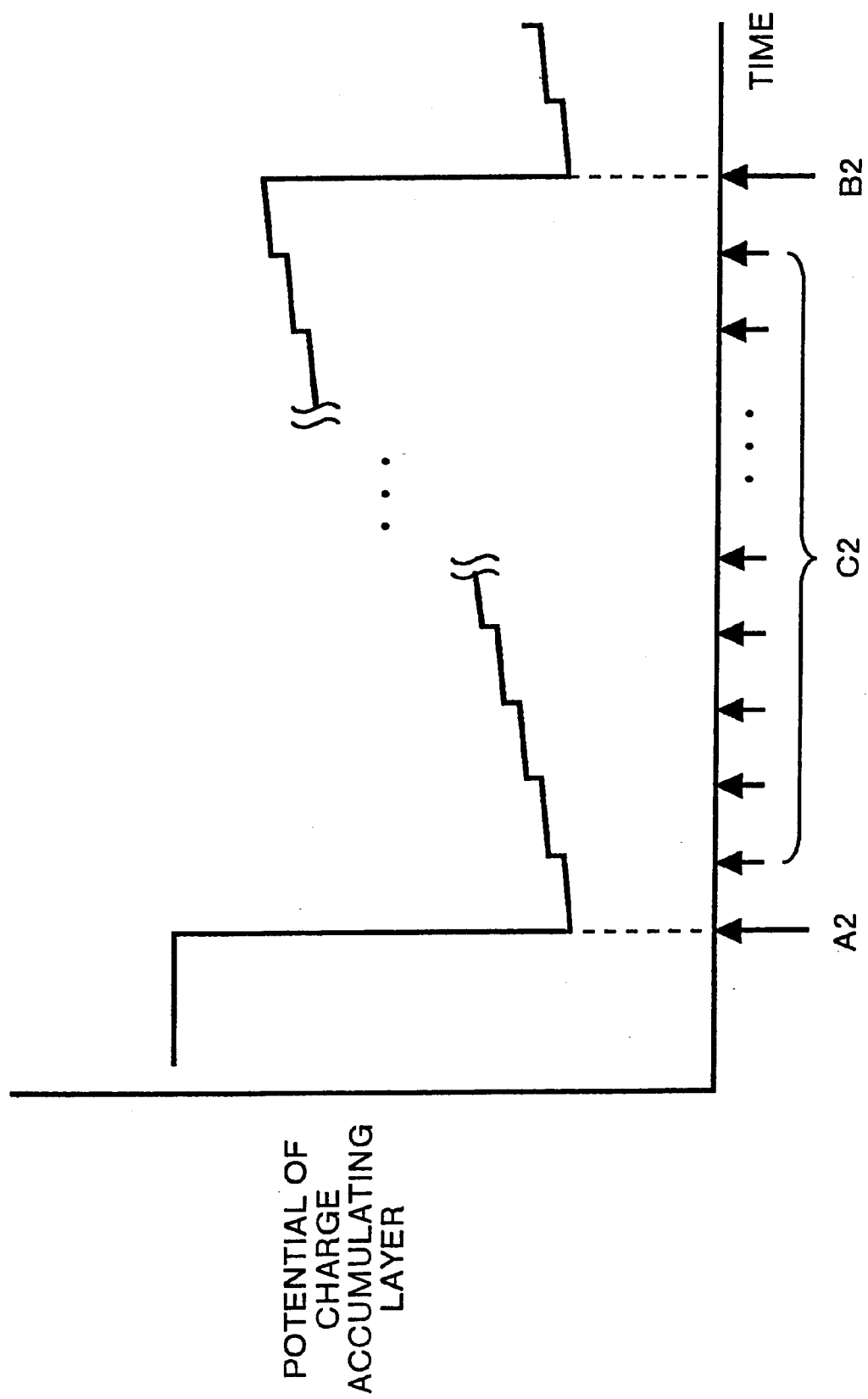

SEMICONDUCTOR IMAGE PICKUP DEVICE

FIELD OF THE INVENTION

The present invention relates to a semiconductor image pickup device provided with an image pickup pixel array. More specifically, this invention relates to a semiconductor image pickup device which sequentially selects pixels based on an X-Y address method and reads the output signal.

BACKGROUND OF THE INVENTION

FIG. 7 is a schematic block diagram of a conventional semiconductor image pickup device of X-Y address type. This semiconductor image pickup device comprises a pixel array 51 having a plurality of pixels arranged in a matrix, column direction read transistors (a column direction read transistor 58n and the like), column direction reset signal buffers (a column direction reset signal buffer 59n and the like), column direction read control line buffers (a column direction read control line buffer 60n and the like) provided for the respective columns of the pixel array 51, and row direction reset signal buffers (a row direction reset signal buffer 61m and the like) and row direction read control line buffers (a row direction read control line buffer 62m and the like) provided for the respective rows of the pixel arrays 51.

Each pixel in the pixel array 51, e.g., a pixel 52mn in row m and column n (the row m and the column n is an arbitrary matrix number of the pixel array 51) comprises a light detecting element (photodiode) 53mn, a column direction reset transistor 54mn, a row direction reset transistor 55mn, an amplification AMI (Amplified MOS Imager) transistor 56mn and a row direction read transistor 57mn. The column direction reset transistor 54mn is connected to the charge accumulation section of the photodiode 53mn.

The column direction reset signal buffer 59n receives a column direction reset signal XR2[n] and turns on or off the respective column direction reset transistors (the column direction reset transistor 54mn and the like) in column n depending upon the received signal. The column direction read signal buffer 60n receives a column direction read signal XS2[n] and turns on or off the column direction read transistor 58n depending upon the received signal. The row direction reset signal buffer 61m receives a column direction reset signal YR2[m] and turns on or off the respective row direction reset transistors (the row direction reset transistor 55mn and the like) in row m depending upon the received signal. The row direction read signal buffer 62m receives a column direction read signal YS2[m] and turns on or off the respective row direction read transistors (the row direction read transistor 57mn and the like) in row m depending upon the received signal.

If both the column direction reset transistor 54mn and the row direction reset transistor 55mn are turned on, the voltage of the anode of the photodiode 53mn becomes a photodiode reset power voltage VDC, charges accumulated in the photodiode 53mn are discharged and the photodiode 53mn is turned into a reset state. That is, the pixel 52mn is reset. If both the column direction read transistor 58n and the row direction read transistor 57mn are turned on, a current according to the charges accumulated in the photodiode 53mn flows into the amplification AMI transistor 56mn and is outputted as an output signal. That is, read operation is carried out.

Further, the same power is supplied to the respective pixels (the pixel 52mn and the like), the column direction reset signal buffers (the column direction reset signal buffer 59n and the like), the column direction read signal buffers (the column direction read signal buffer 60n and the like), the row direction reset signal buffers (the row direction reset signal buffer 61m and the like) and the row direction read signal buffers (the row direction read signal buffer 62m and the like).

FIG. 8 is an explanatory view for the operation of the conventional semiconductor image pickup device. In the operation of the semiconductor image pickup device, two pixels on the pixel array 51 are simultaneously read and reset. For example, when a pixel 52qs in row q and column s is reset, a pixel 52pr in row p and column r is simultaneously read. The positions of the pixels to be reset and read move from a row q, column s position and a row p, column r position to a row q, column (s+1) position and a row p, column (r+1) position, respectively. When the reset and read of pixels in rows q and p are completed, reset and read target rows move to rows (q+1) and (p+1). After completing with the last row and column, the reset or read position returns to the leading row and column. In this way, scanning is carried out.

As for each pixel, a time after the pixel is reset until read or, in case of FIG. 8, a time for which the pixel position moves from the row p, column r position to the row q, column s position becomes a charge accumulation time for each photodiode. Namely, during this charge accumulation time, charges are accumulated in the charge accumulation section of the photodiode of each pixel. If both the corresponding row direction read transistor and the corresponding column direction read transistor are turned on, an output signal according to the accumulated charges is outputted.

FIG. 9 is a timing chart showing the operation of the conventional semiconductor image pickup device. In the operation of the conventional semiconductor image pickup device, first, the row direction reset signal YR2[m] is kept turned on (high level) until the resetting of the row m is completed. Then, when the column direction reset signal XR2[n] is turned on (A2 in FIG. 9), the pixel 52mn is reset. Thereafter, the row direction read signal YS2[m] is kept turned on until the read of the row m is completed. When the column direction reading signal XS2[n] is turned on (B2 in FIG. 9), the pixel 52mn is read.

During a charge accumulation time T2, since the pixel 52mn is reset until being read, the row direction reset signal YR2[m] is turned off after the reset selected row is moved to row (m+1), but the column direction reset signal XR2[n] is turned on and off a plurality of times (C2 in FIG. 9). This is because pixels in rows other than the row m and in column n are reset. The number of times the column direction reset signal XR2[n] is turned on and off corresponds to the positional relationship between a reset target row and a read target row. In case of FIG. 8, for example, the column direction reset signal XR2[n] is turned on and off (q−p−1) times.

In this way, if the column direction reset signal XR2[n] is turned on and off during the charge accumulation time T2, the column direction reset transistor 54mn is turned on and off and charging and discharging are carried out according to the parasitic capacitance between the gate and substrate of the column direction reset transistor 54mn. Part of charges thus charged and discharged flow into the photodiode 53mn, thereby generating a charge-pumping phenomenon so that the potential of the photodiode 53mn changes. FIG. 10A to FIG. 10C are explanatory views for the charge-pumping operation (charge-pumping phenomenon) of the conventional semiconductor image pickup device.

In the charge-pumping phenomenon of the semiconductor image pickup device, first, the row direction reset signal YR2[m] and the column direction reset signal XR2[n] are turned off (low level), a power supply voltage is applied to the gate control signal line 77 of the column direction reset transistor 54mn by the column direction reset signal buffer 59n, and the column direction reset transistor 54mn is turned off. During the charge accumulation time T2, the row direction reset signal YR2[m] is kept turned off and a current between the p+ source layer 71 and p+ drain layer 72 of the column direction reset transistor 54mn is cut off (see FIG. 10A).

Here, when the column direction reset signal XR2[n] is turned on, the gate control signal line 77 is grounded and the charges (electrons in this example) accumulated in the parasitic capacity between the gate 76 and the p-type silicon substrate 75 of the column direction reset transistor 54mn are discharged to an n-well layer 74 side (see FIG. 10B). Thereafter, when the column direction reset signal XR2[n] is turned off, a power supply voltage is applied again to the gate control signal line 77 and charges are accumulated again in the parasitic capacitance between the gate 76 and the p-type silicon substrate 75. In this charge and discharge process, part of charges flow into the charge accumulation section (p-charge accumulation layer) 73 of the photodiode 53mn (see FIG. 10C). As a result, the potential of the p-charge accumulation layer 73 changes.

FIG. 11 shows how the quantity of accumulated charges of the photodiode 53mn changes with the passage of time in case of the conventional semiconductor image pickup device. As shown in FIG. 11, during the charge accumulation time T2, whenever the column reset signal XR2[n] is turned on or off, the photodiode 53mn has a change in charge accumulation quantity due to the charge-pumping operation. That is, in addition to the charge accumulation by the optical signal from the outside, the charge accumulation by charge pump operation is carried out. The potential variation of the photodiode due to this charge pumping operation is susceptible to process irregularities such as the finished dimensions of the gate of the column direction reset transistor. Due to this, the potential variation differs among the pixels, which is one cause for fixed pattern noise.

Nevertheless, according to the conventional technique, the column direction reset signal buffers control switching gates (column direction reset transistors) connected to the charge accumulation section of the light detecting elements, respectively, while using the power voltage common to the pixel array 51. For that reason, the quantity of charge to be charged and discharged in the charge pumping operation increases, thereby disadvantageously increasing fixed pattern noise.

SUMMARY OF THE INVENTION

It is an object of the present invention to obtain a semiconductor image pickup device capable of reducing fixed pattern noise.

The semiconductor image pickup device according to the present invention comprises a switching gate control unit for controlling the switching gate using a lower control power supply voltage than a power supply voltage of the pixel array. This switching gate control unit controls the switching gate connected to the charge accumulation section of the light receiving element using a lower control power supply voltage than the power supply voltage of the pixel array. As a result, the quantity of charges to be charged and discharged in the charge-pumping operation is decreased.

Further, the control power supply voltage is set to be lower than the power supply voltage of the pixel array and to be not lower than a voltage obtained by subtracting the threshold voltage of the transistor in the switching gate control unit turned on if the switching gate is cut off, from the power supply voltage of the pixel array. Because of such arrangement, it is possible to suppress leak current flowing from the light receiving element through the transistor.

Further, a control power supply voltage generation unit is provided for generating the control power supply voltage. Accordingly, it is not necessary to input a control power supply voltage from an external circuit.

Further, the control power supply voltage generation unit is a resistance division circuit dividing the power supply voltage of the pixel array by a plurality of resistors and generating the control power supply voltage. Thus, power consumption can be reduced.

Other objects and features of this invention will become apparent from the following description with reference to the accompanying drawings.

BRIEF DESCRIPTION OF THE DRAWINGS

FIG. 5 shows the fixed pattern noise of the semiconductor image pickup device in the first embodiment;

FIG. 11 shows how the quantity of accumulated charge of the photodiode of the conventional semiconductor image pickup device changes with the passage of time.

DESCRIPTION OF THE PREFERRED EMBODIMENTS

Two preferred embodiments of the semiconductor image pickup device according to the present invention will be described hereinafter in detail with reference to the accompanying drawings. However, this invention should not be limited only to these embodiments.

Figure 1:
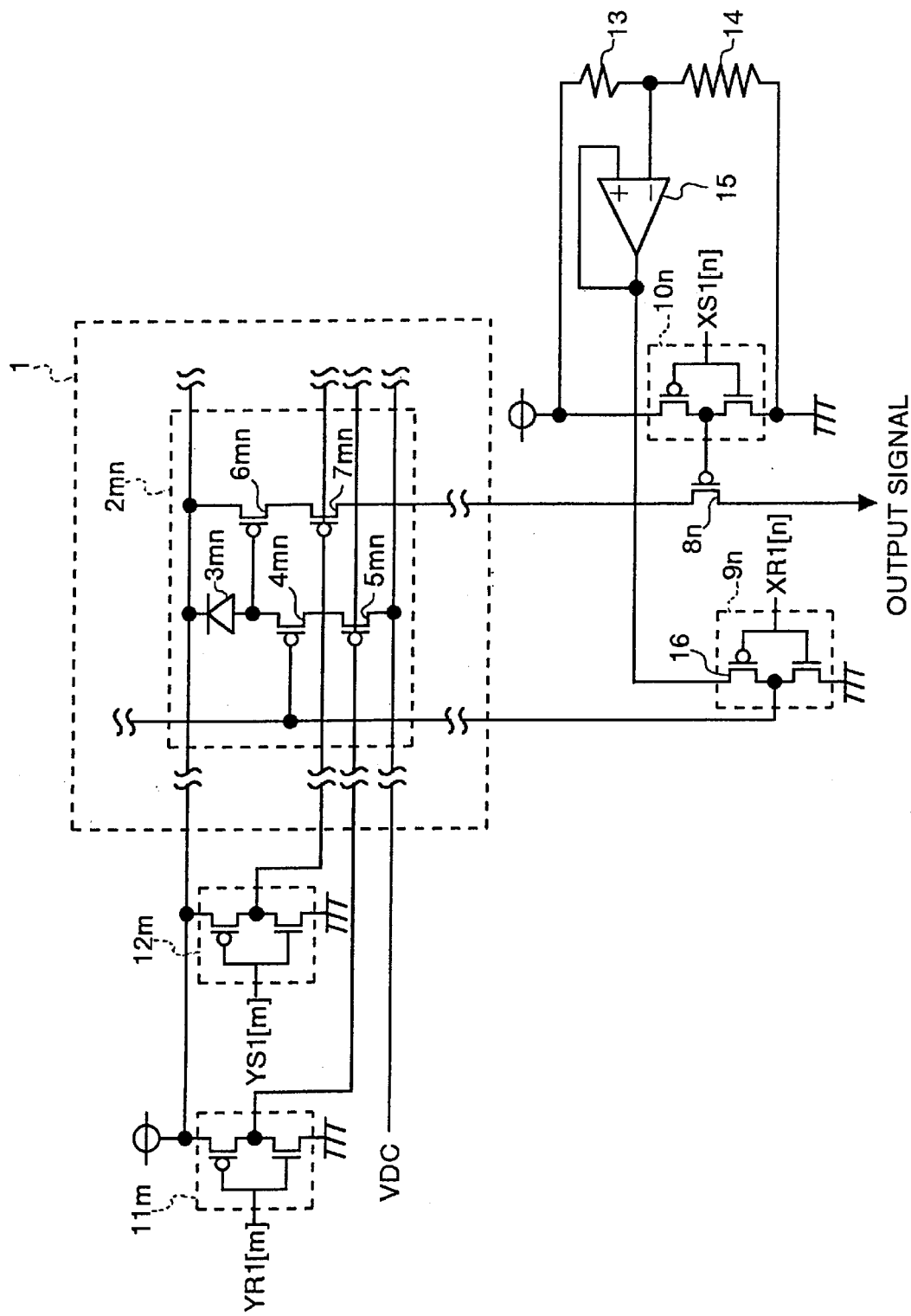
FIG. 1 is a schematic block diagram of a semiconductor image pickup device in a first embodiment of the present invention.

The first embodiment of the present invention will now be explained. FIG. 1 is a schematic block diagram of a semiconductor image pickup device of X-Y address type according to the first embodiment of the present invention. This semiconductor image pickup device comprises a pixel array 1 having a plurality of pixels arranged in a matrix, as well as column direction read transistors (a column direction read transistor 8n and the like), column direction reset signal buffers (a column direction reset signal buffer 9n and the like) and column direction read control line buffers (a column direction read control line buffer 10n and the like) provided for the respective columns of the pixel array 1.

The semiconductor device also comprises row direction reset signal buffers (a row direction reset signal buffer 11m and the like) and row direction read control line buffers (a row direction read control line buffer 12m and the like) provided for the respective rows of the pixel array 1, as well as resistors 13 and 14 provided in series between the power supply of the pixel array 1 and a ground and an operational amplifier 15 provided between the middle point of the resistors 13 and 14 and the column direction reset signal buffers.

Each pixel of the pixel array 1, e.g., a pixel 2mn in row m and column n (where the row m and column n is an arbitrary matrix number of the pixel array 1) comprises a light receiving element (photodiode) 3mn, a column direction reset transistor 4mn, a row direction reset transistor 5mn, an amplification AMI (Amplified MOS Imager) transistor 6mn and a row direction read transistor 7mn.

The resistors 13, 14 and the operational amplifier 15 constitute a circuit for generating a control power supply voltage which value is lower than that of the power supply voltage of the pixel array 1. The circuit supplies this control power supply voltage to the respective column direction reset buffers. Namely, using two divided resistors 13 and 14, an intermediate potential (a control power supply voltage) is generated. The value of the control power supply voltage is VDD·R2 (R1+R2) while assuming that the power supply voltage value of the pixel array 1 is VDD, the resistance value of the resistor 13 is R2 and the resistance value of the resistor 14 is R1.

This circuit employs the operational amplifier 15. Due to this, even if the number of pixels increases and the parasitic capacity of signal lines increases, it is possible to ensure stable operation. Further, by setting the resistance values of the resistors 13 and 14 at maximum values or values close to the maximum values in a range in which the parasitic capacity of the signal lines can be charged and discharged and in which the charge accumulation section of the photodiode can be reset, power consumption can be minimized.

The photodiode 3mn, which has a cathode connected to the power supply of the pixel array 1, converts an optical signal from an external unit into an electric signal and accumulates charges according to the optical signal in the charge accumulation section. The column direction reset transistor 4mn is a p-type MOS transistor and has a source connected to the anode of the photodiode 3mn. The row direction reset transistor 5mn is a p-type MOS transistor and has a source connected to the drain of the column direction reset transistor 4mn and a drain connected to a photodiode reset power supply (voltage VDC).

The amplification AMI (Amplified MOS Imager) transistor 6mn is a p-type MOS transistor. The transistor 6mn has a gate connected to the anode of the photodiode 3mn and a source connected to the power supply of the pixel array 1, and flows a current according to the charges accumulated in the photodiode 3mn. The row direction read transistor 7mn is a p-type MOS transistor and has a source connected to the drain of the amplification AMI transistor 6mn. The column direction read transistor 8n is a p-type MOS transistor. The transistor 8n has a source connected to the drain of the respective row direction read transistors in column n and outputs an output signal from the drain. While this embodiment shows a case where the transistors of the respective pixels are p-type transistors, they may be n-type transistors, or some may be p-type transistors and others may be n-type transistors.

The column direction reset signal buffer 9n is constituted by a CMOS circuit. The buffer 9n receives a column direction reset signal XR1[n] from the gates of a p-type MOS transistor 16 and of an n-type MOS transistor in this CMOS circuit. Using the control power supply voltage from the operational amplifier 15, the buffer 9n turns on and off the respective column direction reset transistors (the column direction reset transistor 4mn and the like) in column n. To cut off the respective column direction reset transistors, the p-type MOS transistor 16 is turned on.

The resistance values of the resistors 13 and 14 are set so that the control power supply voltage has a higher voltage value than a value obtained by subtracting the threshold voltage of the p-type MOS transistor 16 from the power supply voltage of the pixel array 1. By so setting, it is possible to prevent leak current flowing from the photodiodes of the respective column direction reset transistors through the p-type MOS transistor 16. The column direction read signal buffer 10n is constituted by a CMOS circuit. The buffer 10n receives a column direction read signal XS1[n] from the gate of the p-type MOS transistor and that of the n-type MOS transistor in the CMOS circuit and turns on and off the column direction read transistor 8n using the power supply voltage of the pixel array 1.

Further, the row direction reset signal buffer 11m is constituted by a CMOS circuit. The buffer 11m receives a row direction reset signal YR1[m] from the gate of a p-type MOS transistor and that of an n-type MOS transistor in this CMOS circuit, and turns on and off the respective row direction reset transistors (the row direction reset transistor 5mn and the like) in row musing the power supply voltage of the pixel array 1. The row direction read signal buffer 12m is constituted by a CMOS circuit. The buffer 12m receives a column direction read signal YS1[m] from the gates of a p-type MOS transistor and an n-type MOS transistor in this CMOS circuit and turns on and off the respective row direction read transistors (the row direction read transistor 7mn and the like) using the power supply voltage of the pixel array 1.

When both the column direction reset transistor 4mn and the row direction reset transistor 5mn are turned on, the voltage of the anode of the photodiode 3mn becomes the power supply voltage VDC for resetting the photodiode and the charges accumulated in the photodiode 3mn are discharged, turning the photodiode 3mn in a reset state. That is, the pixel 2mn is reset. When both the column direction read transistor 8n and the row direction read transistor 7mn are turned on, a current according to the charges accumulated in the photodiode 3mn flows into the amplification AMI transistor 6mn and is outputted as an output signal through the row direction read transistor 7mn and the column direction read transistor 8n. That is, the pixel 2mn is read.

In the first embodiment, while the power supply of the column direction read signal buffer 10n, the row direction reset signal buffer 11m and the row direction read signal buffer 12m is common to the power supply of the pixel array 1, the buffers 10n, 11m and 12m may have different voltage values from that of the pixel array 1. Alternatively, the rows and the columns may be replaced in this embodiment. It is noted that the column direction reset transistor 4mn corresponds to the switching gate of the present invention, the column direction reset signal buffer 9n corresponds to the switching gate control unit of the present invention and the circuit consisting of the resistors 13, 14 and the operational amplifier 15 corresponds to the control power supply voltage generation unit of the present invention.

Figure 2:
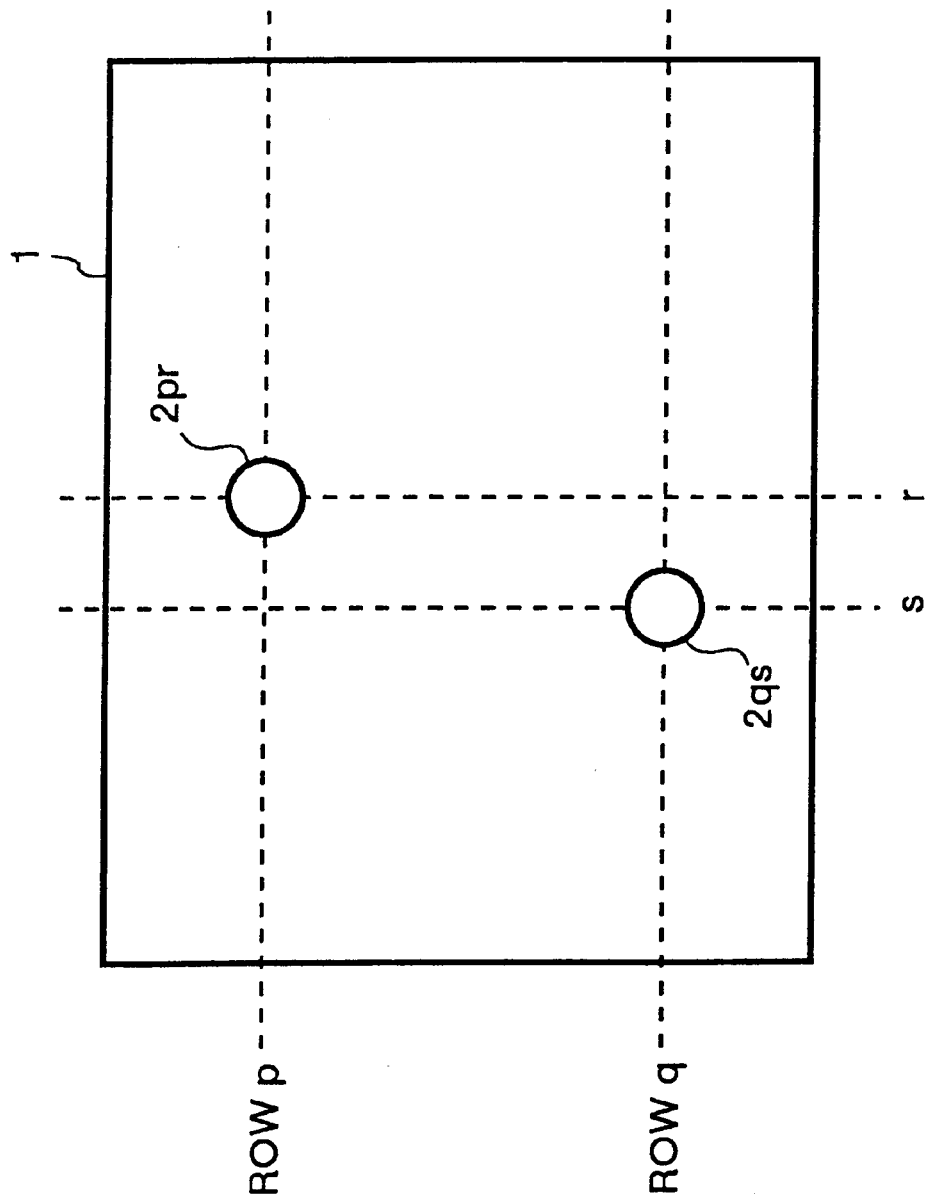
FIG. 2 is an explanatory view for the operation of the semiconductor image pickup device in the first embodiment.

The operation of the semiconductor image pickup device according to the first embodiment will be described with reference to FIG. 2 to FIG. 5. FIG. 2 is an explanatory view for the operation of the semiconductor image pickup device in the first embodiment. In the same manner as in the case of the conventional device, two pixels are simultaneously read and reset on the pixel array 1. For example, when a pixel 2qs in row q and column s is reset, a pixel 2pr in row p and column r is simultaneously read. The positions of the pixels to be reset and read move from a row q, column s position and a row p, column r position to a row q, column (s+1) position and a row p, column (r+1) position, respectively. When the reset and read of pixels in rows q and p are completed, reset and read target rows move to rows (q+1) and (p+1). After completing with the last row and column, the reset or read position returns to a leading row and column. In this way, scanning is carried out.

As for each pixel, a time after the pixel is reset until read or, in case of FIG. 2, a time for which the pixel position moves from the row p, column r position to the row q, column s becomes a charge accumulation time for each photodiode. Namely, during this charge accumulation time, charges are accumulated in the charge accumulation section of the photodiode of each pixel. If both the corresponding row direction read transistor and the corresponding column direction read transistor are turned on, an output signal according to the accumulated charges is outputted.

Figure 3:
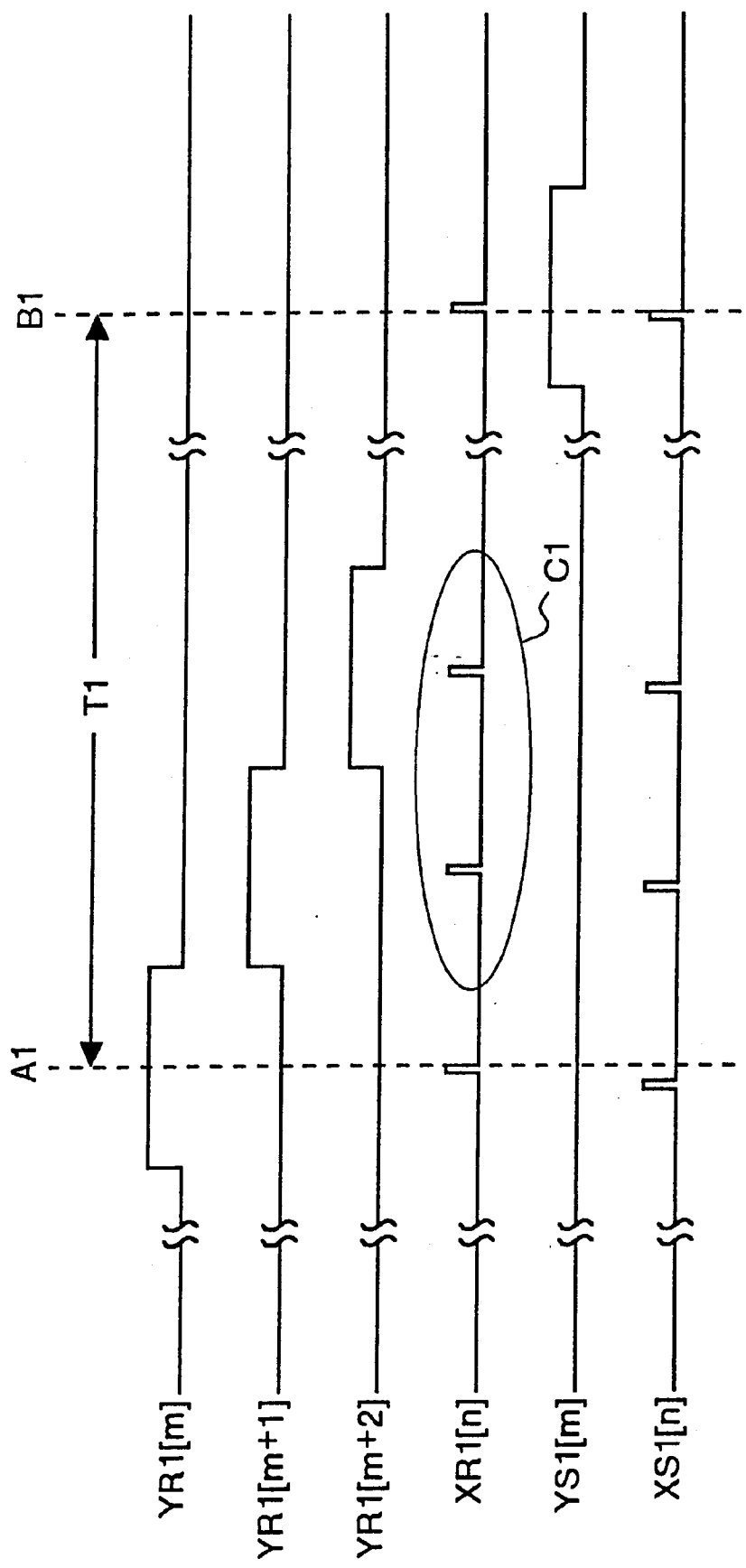
FIG. 3 is a timing chart showing the operation of the semiconductor image pickup device in the first embodiment.

FIG. 3 is a timing chart showing the operation of the semiconductor image pickup device in the first embodiment. In the operation of the semiconductor image pickup device, as in the case of the above-stated conventional device, first, the row direction reset signal YR1[m] is kept to be turned on (high level) until the reset of the row m is completed. Then, when the column direction reset signal XR1[n] is turned on (A1 in FIG. 3), the pixel 2mn is reset. Thereafter, the row direction read signal YS1[m] is kept to be turned on until the read of the row m is completed. When the column direction read signal XS1[n] is turned on (B1 in FIG. 3), the pixel 2mn is read.

During a charge accumulation time T1 since the pixel 2mn is reset until being read, the row direction reset signal YR1[m] is turned off after the reset selected row is moved to row (m+1) but the column direction reset signal XR1[n] is turned on and off a plurality of times (C1 in FIG. 3). This is because pixels in rows other than the row m and in column n are reset. The number of times at which the column direction reset signal XR1[n] is turned on and off corresponds to the positional relationship between a reset target row and a read target row. In case of FIG. 2, for example, the column direction reset signal XR1[n] is turned on and off (q−p−1) times.

FIG. 4 is an explanatory view for the charge-pumping operation (charge pumping phenomenon) of the semiconductor image pickup device in the first embodiment. In the charge-pumping operation of the semiconductor image pickup device, first, the row direction reset signal YR1[m] and the column direction reset signal XR1[n] are turned off (low level), a control power supply voltage is applied to the gate control signal line 27 of the column direction reset transistor 4mn by the column direction reset signal buffer 9n, and the column direction reset transistor 4mn is turned off.

Figure 4C:
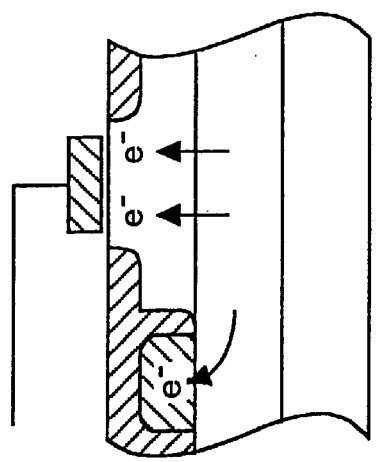
FIG. 4A to FIG. 4C are explanatory views of the charge pumping operation of the semiconductor image pickup device in the first embodiment.
Figure 4B:
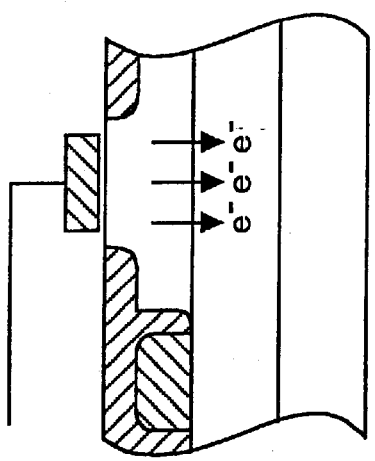
Figure 4A:
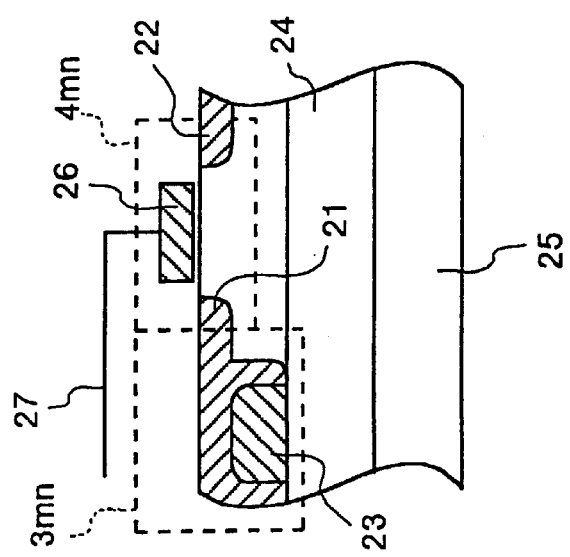

During the charge accumulation time T1, the row direction reset signal YR1[m] is kept to be turned off and a current is cut off between the p+ source layer 21 and p+ drain layer 22 of the column direction reset transistor 4mn (see FIG. 4A).

When the column direction reset signal XR1[n] is turned on, the gate control signal line 7 is grounded and charges (electrons in this case) accumulated in the parasitic capacity between the gate 26 and the p-type silicon substrate 25 of the column direction reset transistor 4mn are discharged to an n-well layer 24 side (see FIG. 4B). Thereafter, when the column direction reset signal XR1[n] is turned off, a control power supply voltage is applied again to the gate control signal line 7 and charges are accumulated again in the parasitic capacity between the gate 26 and the silicon substrate 25.

In this semiconductor image pickup device, if the column direction reset transistor 4mn is cut off, a voltage applied to the gate 26 is a control power supply voltage lower than the power supply voltage of the pixel array 1. Due to this, charges flowing into the charge accumulation section (p charge accumulation layer) 23 of the photodiode 3mn in the charge and discharge process are reduced (see FIG. 4C). In this way, this semiconductor image pickup device is capable of suppressing the charge-pumping operation and reducing fixed pattern noise.

FIG. 5 shows the fixed pattern noise of the semiconductor image pickup device in the first embodiment. As shown in FIG. 5, the fixed pattern noise of this semiconductor image pickup device is reduced compared with that of the above-stated conventional device. That is, if the charge accumulation time is shorter than a time in which the scanning of the number of rows M on the pixel array 1 are completed, the reduced amount of the fixed pattern increases proportionately to the charge accumulation time (or by how many rows a reset target row and a read target row are distant from each other).

As stated above, according to the first embodiment, the respective column direction reset signal buffers (the column direction reset signal buffer 9n and the like) control the corresponding column direction reset transistors (the column direction reset transistor 4mn and the like) using the control power supply voltage lower than the power supply voltage of the pixel array 1. As a result, the quantity of charges in the charge pumping operation decreases, thereby making it possible to reduce fixed pattern noise.

Further, the control power supply voltage is set to be lower than the power supply voltage of the pixel array 1 and to be not lower than a voltage value obtained by subtracting the threshold voltages of the transistors (the p-type MOS transistor 16 and the like) to be turned on, of the respective column direction reset signal buffers from the power supply voltage of the pixel array 1. By so setting, it is possible to suppress leak current flowing from the photodiodes (the photodiode 3mn and the like) through the p-type MOS transistors (the p-type MOS transistor 16 and the like) and to thereby keep output signal level appropriate. Further, the control power supply voltage generation circuit consisting of the resistors 13, 14 and the operational amplifier 15 is provided on the semiconductor image pickup device. By so doing, it is not necessary to input a control power supply voltage from an external circuit, making it possible to facilitate the design of external circuits and to reduce cost.

Figure 6:
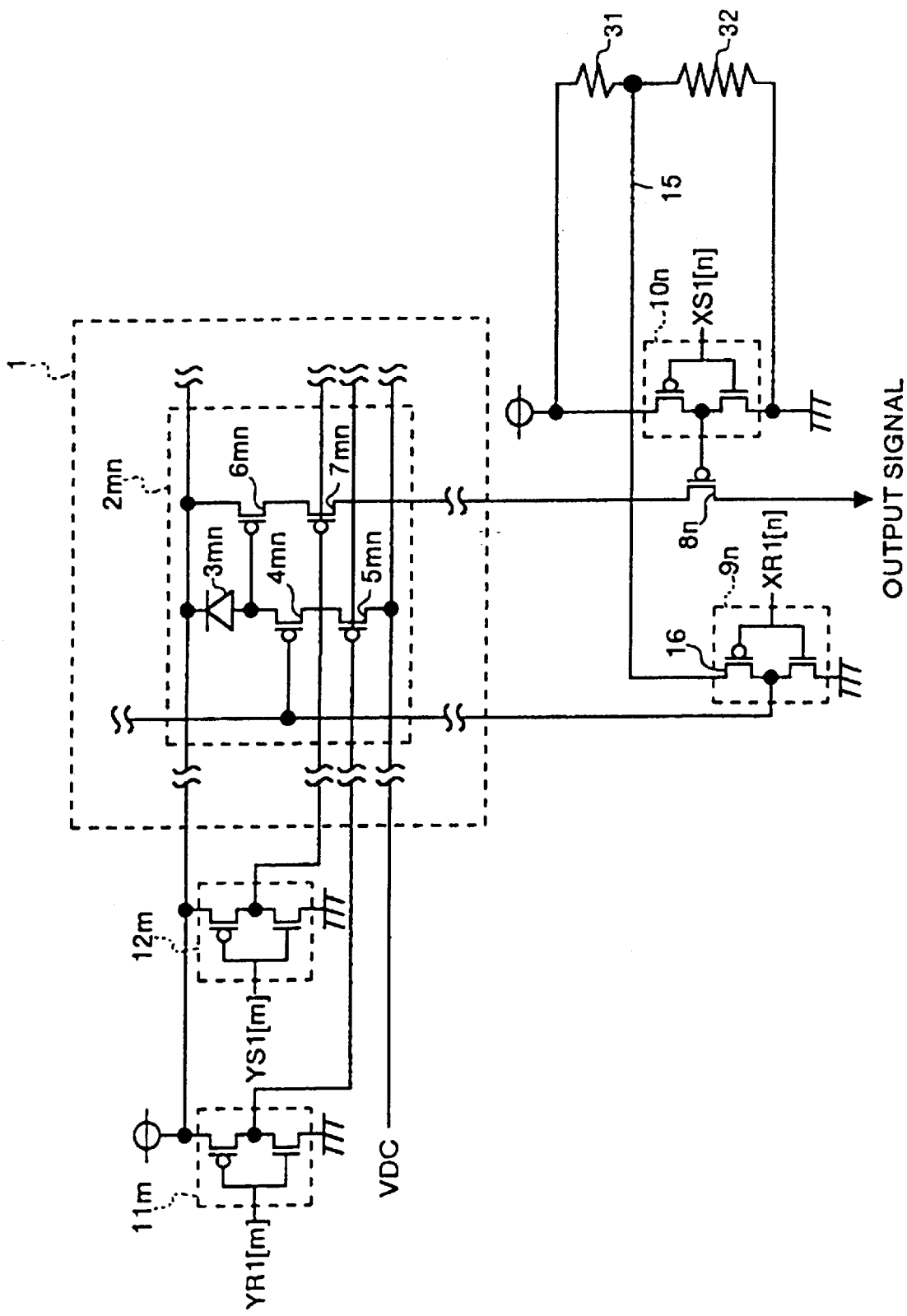
FIG. 6 is a schematic block diagram of a semiconductor image pickup device in a second embodiment of the present invention.
Figure 7:
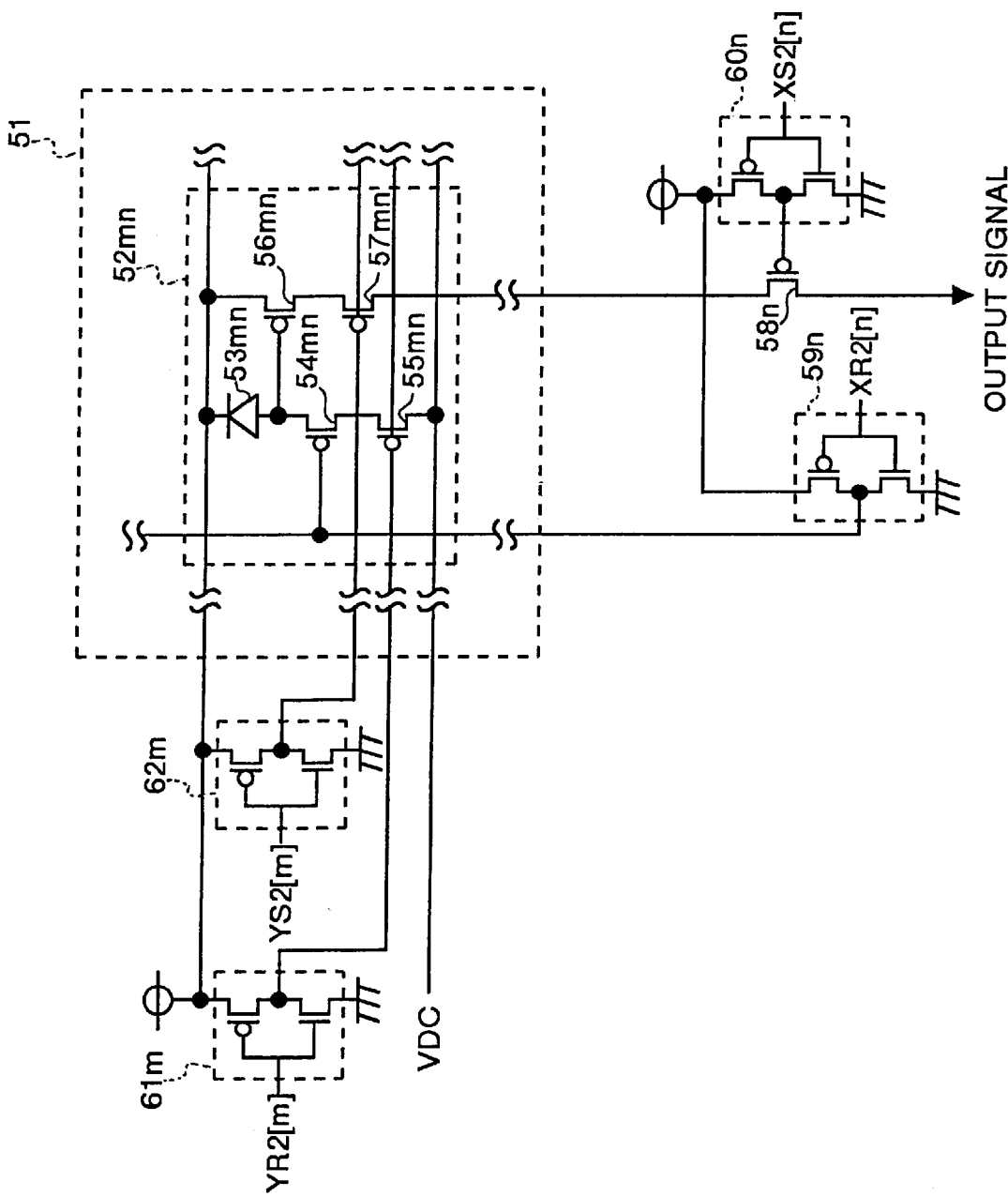
FIG. 7 is a schematic block diagram of a conventional semiconductor image pickup device.
Figure 8:
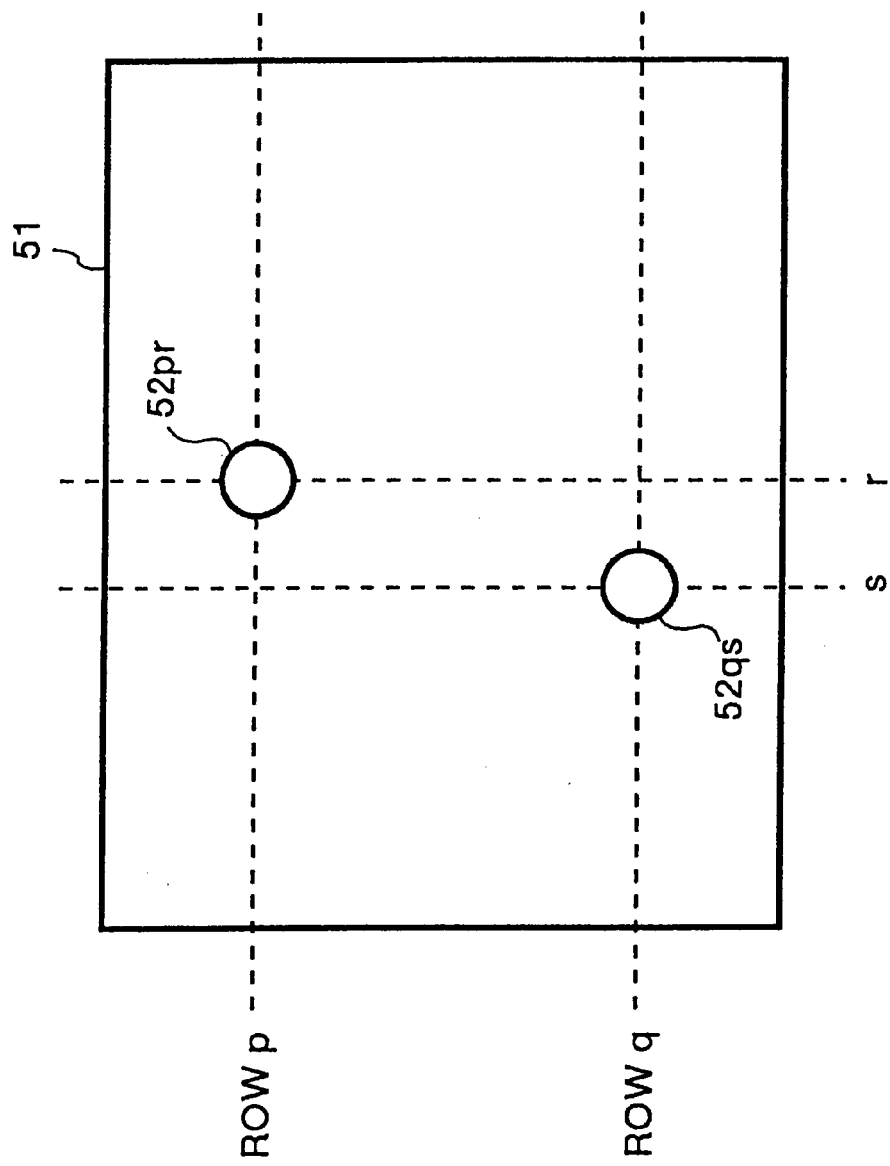
FIG. 8 is an explanatory view for the operation of the conventional semiconductor image pickup device.
Figure 9:
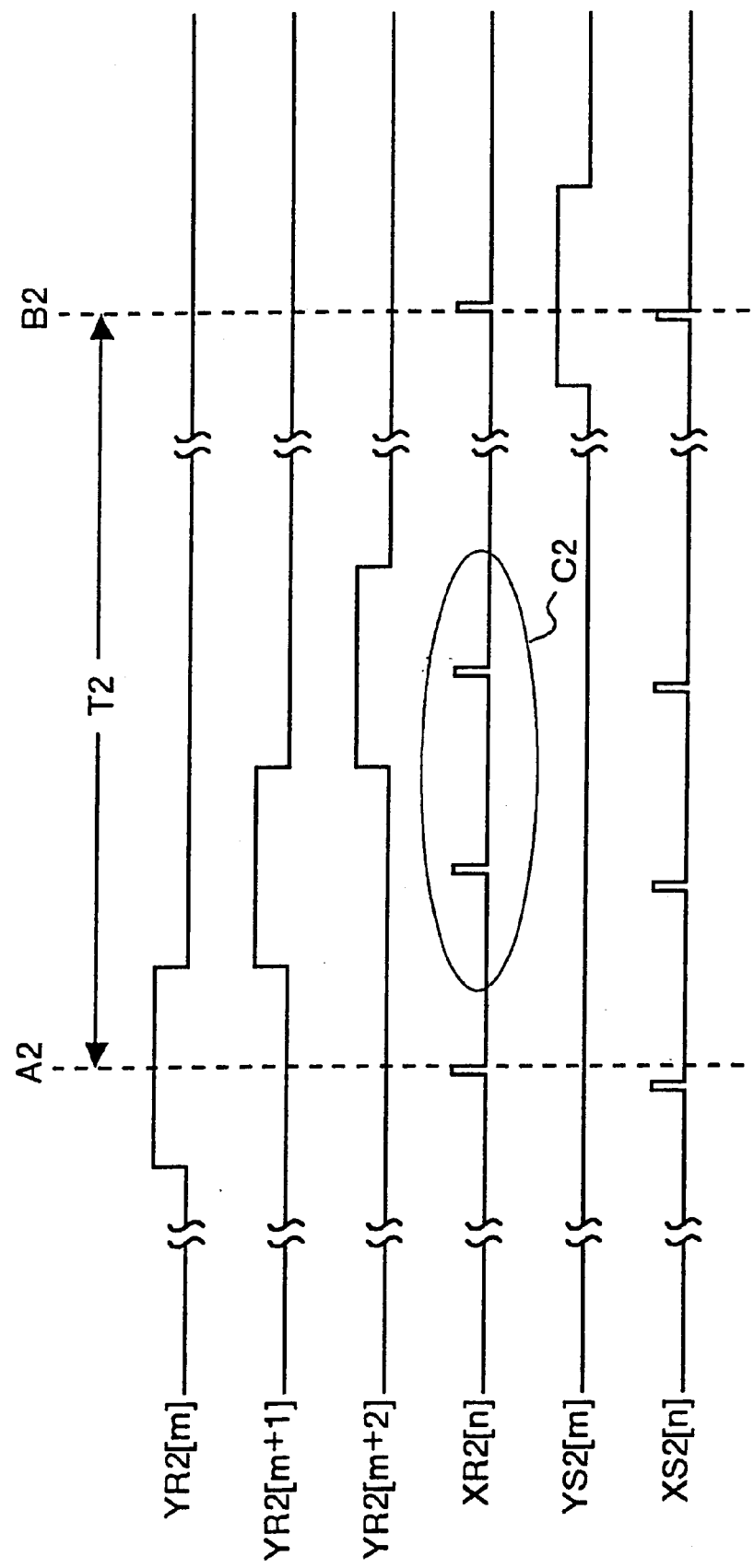
FIG. 9 is a timing chart showing the operation of the conventional semiconductor image pickup device.
Figure 10C:
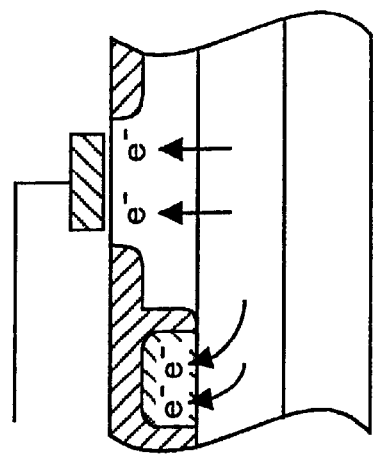
FIG. 10A to FIG. 10C are explanatory views of the operation of the conventional semiconductor image pickup device.
Figure 10B:
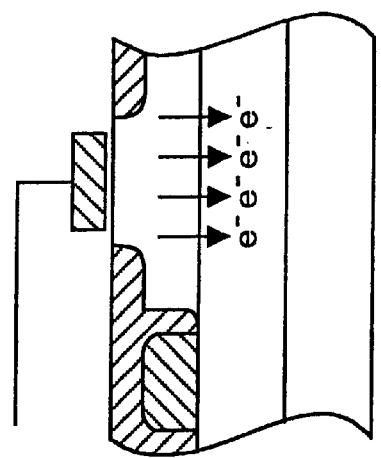
Figure 10A:
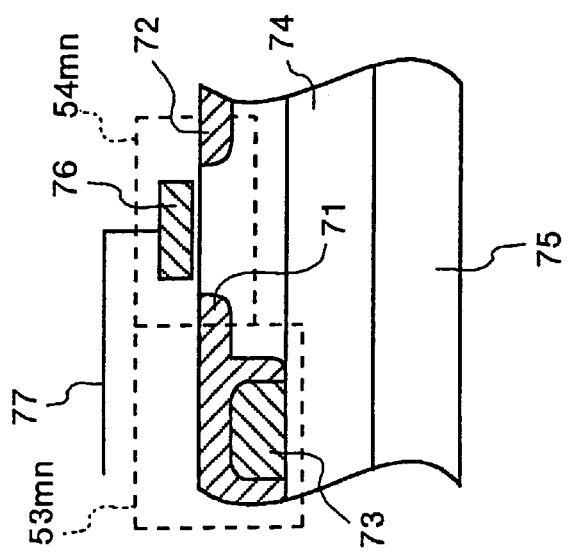

The second embodiment of the present invention will now be explained. In this second embodiment, a control power supply voltage generation circuit only consisting of a resistance division circuit is provided instead of the control power supply voltage consisting of the resistors 13, 14 and the operational amplifier 15 as shown in the first embodiment described above. Since the basic constitution and operation of the semiconductor image pickup device in this embodiment are the same as those in the first embodiment, only different parts will be described herein. FIG. 6 is a schematic block diagram of the semiconductor image pickup device in the second embodiment. It is noted that the same constituent elements as those in the first embodiment are denoted by the same legends.

As shown in FIG. 6, this semiconductor image pickup device comprises resistors 31 and 32 provided in series between the power supply of a pixel array 1 and a ground instead of the resistors 13, 14 and the operational amplifier 15 provided in the semiconductor image pickup device in the first embodiment. The middle point of a resistance division circuit consisting of the resistors 31 and 32 is connected to respective column direction reset signal buffers (a column direction reset signal buffer 9n and the like). The resistance division circuit supplies an intermediate potential (a control power supply voltage) to the respective column direction reset signal buffers. The remaining constituent elements and operation are the same as those in the first embodiment.

As described above, according to the second embodiment, the resistance division circuit consisting of the resistors 31 and 32 generate a power supply voltage for the respective column direction reset signal buffers (the column direction reset signal buffer 9n and the like) without using an operational amplifier. This can reduce the number of parts, cost and the power consumption corresponding to the power consumed by the operational amplifier.

As stated so far, according to the present invention, the switching gate control unit controls the switching gate connected to the charge accumulation section of the light receiving element using a lower control power supply voltage than the power supply voltage of the pixel array. As a result, the quantity of charges to be charged and discharged in the charge-pumping operation is decreased. Thus, fixed pattern noise can be advantageously reduced.

Further, the control power supply voltage is set to be lower than the power supply voltage of the pixel array and to be not lower than a voltage obtained by subtracting the threshold voltage of the transistor in the switching gate control unit turned on if the switching gate is cut off, from the power supply voltage of the pixel array. By so setting, it is possible to suppress leak current flowing from the light receiving element through the transistor. Thus, it is possible to advantageously hold an appropriate output signal level.

Further, the control power supply voltage generation unit generates the control power supply voltage. Thus, it is not necessary to input a control power supply voltage from an external circuit. This can advantageously facilitate the design of external circuits and reduce cost.

Further, the control power supply voltage generation unit is constituted by the resistance division circuit without using an operational amplifier. Thus, power consumption can be advantageously reduced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A semiconductor image pickup device comprising:

a pixel array having a plurality of pixels arranged in a matrix, each pixel having a light detecting element for converting an optical signal into an electrical signal and a switching gate connected to a charge accumulation section of said light detecting element; and a switching gate control unit which controls said switching gate using a control power supply voltage lower than a power supply voltage of said pixel array, wherein said control power supply voltage is not lower than a voltage obtained by subtracting a threshold voltage of a transistor in said switching gate control unit from the power supply voltage of said pixel array, said transistor being turned on if said switching gate is cut off.

2. The semiconductor image pickup device according to claim 1, further comprising a control power supply voltage generation unit for generating the control power supply voltage.

3. The semiconductor image pickup device according to claim 2, wherein said control power supply voltage generation unit comprises a resistance division circuit dividing the power supply voltage of said pixel array using a plurality of resistors, thereby generating the control power supply voltage.

* * * * *